May 21, 1929.  J. E. POYSER  1,714,134
VARIABLE THROW CRANK FOR BICYCLES
Filed Jan. 31, 1928   2 Sheets-Sheet 1
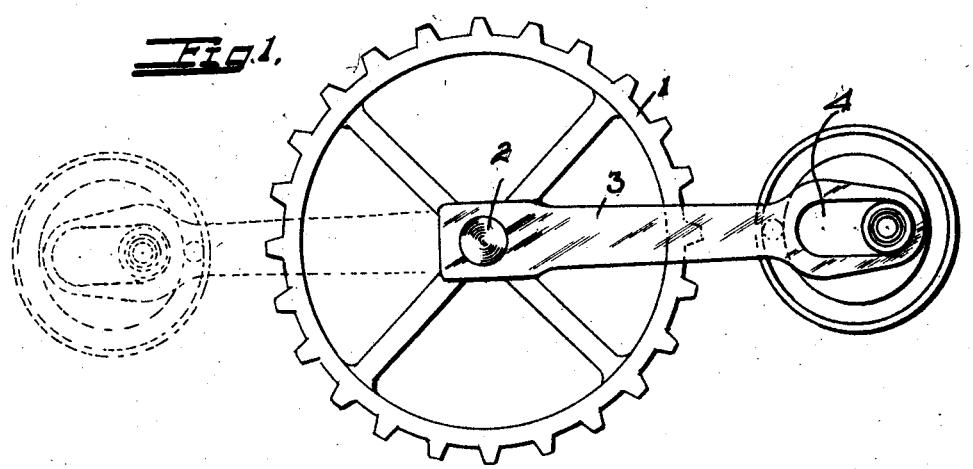
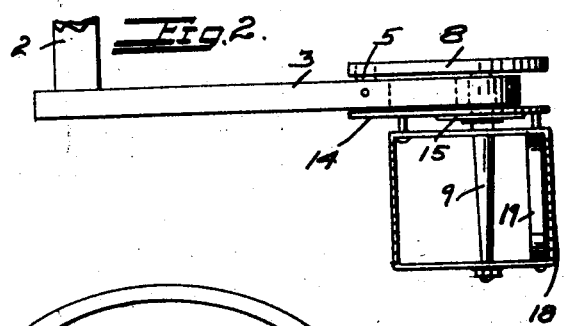
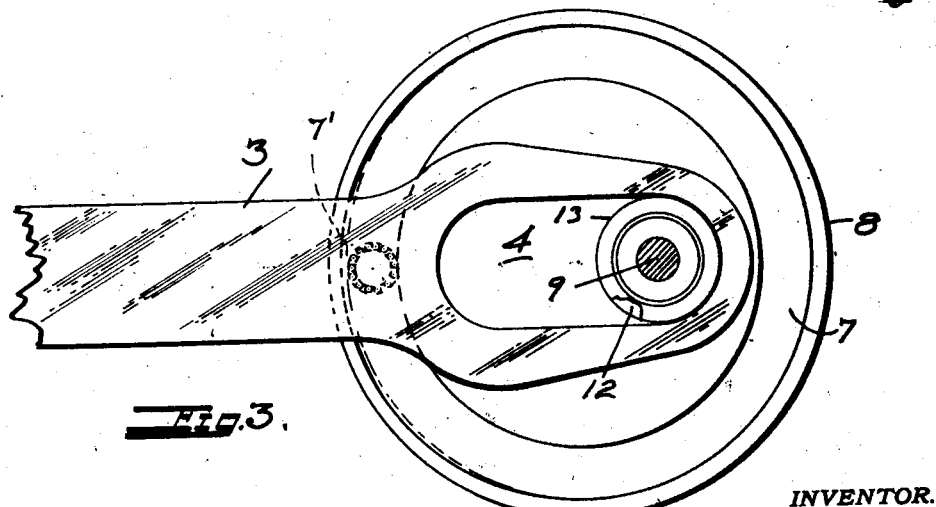
INVENTOR.
James E. Poyser
BY
Carlos P. Griffin
ATTORNEY.

May 21, 1929.  J. E. POYSER  1,714,134
VARIABLE THROW CRANK FOR BICYCLES
Filed Jan. 31, 1928    2 Sheets-Sheet 2
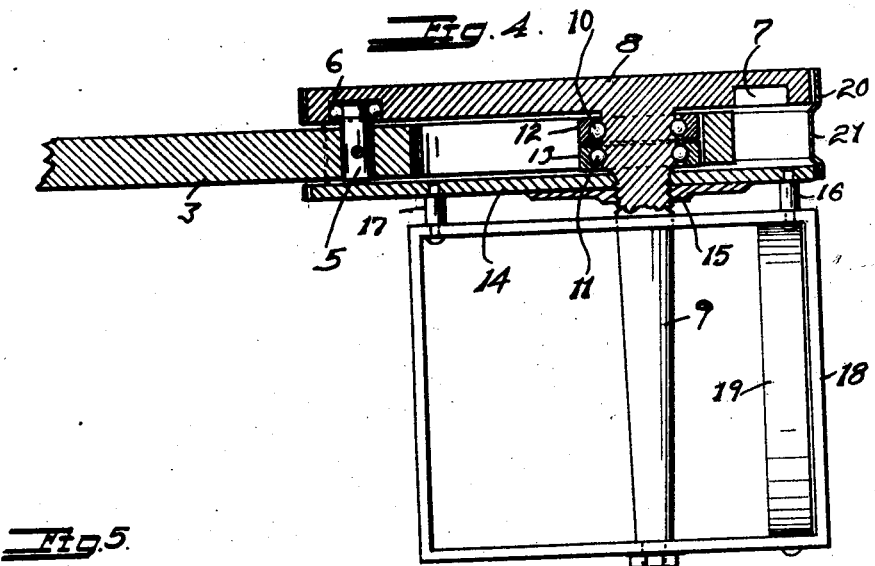
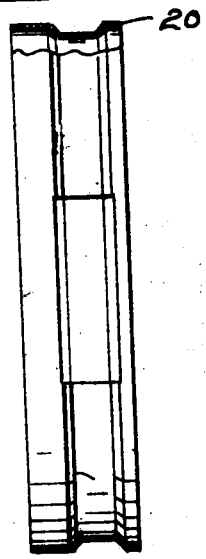
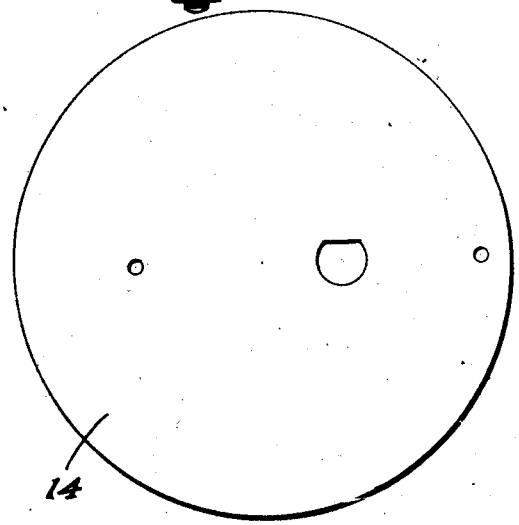
INVENTOR.
James E. Poyser.
BY
Carlos P. Griffin
ATTORNEY.

Patented May 21, 1929.

1,714,134

UNITED STATES PATENT OFFICE.

JAMES E. POYSER, OF SAN FRANCISCO, CALIFORNIA.

VARIABLE-THROW CRANK FOR BICYCLES.

Application filed January 31, 1928. Serial No. 250,940.

This invention relates to a variable throw crank for bicycles, and its special object is to produce a crank which will enable the user to have a greater leverage on the bicycle on the down throw than on the up throw, thereby making it more convenient to operate, and giving the feet less travel on the up throw than on the down throw, whereby the operation of driving the bicycle is more easily effected.

Another object of the invention is to provide means whereby the friction on the apparatus for shifting the pedal from the minimum throw to the maximum throw and vice versa will be greatly reduced.

A further object of the invention is to provide a dust guard for the crank operating apparatus which will prevent the ball bearings used at the end of the crank from getting filled with dust.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a side elevation of a bicycle sprocket wheel, one crank, and a portion of the apparatus for shifting the pedal from one position to the other, certain of the parts being removed for purpose of illustration, Figure 2 is a plan view of the crank shown in Figure 1, with the cover removed, Figure 3 is a side elevation on a slightly larger scale of the end of the crank, the guide disk and its hand groove being shown, Figure 4 is a sectional view through the crank showing the bearings for guiding the pedal and pedal pin, Figure 5 is an edge view of the dust guard, and Figure 6 is a side elevation of the disk to which the pedal pin is secured.

The sprocket wheel is indicated at 1, the main bearing pin therefor at 2, the crank 3 is secured to the main bearing pin 2 and has a slot therein at its end as indicated at 4. Adjacent the inner end of the slot of the crank there is a pin 5 which has some balls 6 bearing thereon, which balls run in a groove 7 in the disk 8, said disk having the pedal pin 9 projecting therefrom, either as a unit as shown or as an independent pin.

The pin 9 has raceways for two sets of balls 10 and 11 which balls carry the rings 12 and 13 to bear upon the slot in the crank in which the pedal pin travels. There is another disk 14 which is assembled on the pedal pin 9 and secured in place thereon by means of a flat nut 15, this disk has the rivets 16 and 17 for securing the pedal frame 18 thereto, said frame carrying the toe clip 19 to prevent the frame from being turned upside down.

On the outside of the disks 8 and 14 there is a guard ring 20, said guard ring being flanged inwardly at 21 to prevent it from being displaced from its proper position.

It will be noted that as the crank turns around that the pedal frame 18 remains in the same horizontal position, and this will cause the pedal frame and pin to travel toward and from the end of the crank, and as the pressure of the foot on the pin causes a slight twisting of the pedal pin with respect to the crank, the rings 12 and 13 will rotate reversely, that is, one will bear harder on the lower portion of the slot while at the same time the other is bearing harder on the upper portion of the slot.

The groove 7 is wider at 7' to allow the pedal to rise without bringing it back to the short radius too soon on the down stroke.

In the event that the rider of the bicycle goes down a steep hill, he may turn the pedal over if he desires in which event the conditions with respect to the crank will be reversed and he thereby is able to brake the machine with more advantage.

Having thus described my invention, what I desire to secure by Letters Patent of the United States is as follows, but modifications may be made in carrying out the invention as shown in the drawing and in the above particularly described form thereof, within the purview of the annexed claims:

1. A crank for bicycles comprising an arm, a revoluble shaft adapted to carry the same, said arm having a slot therein, a pedal frame, a pedal pin for supporting said frame in said slot, ball bearings in said slot, a disk to which said pin is connected, an annular groove in said disk, a pin on said arm extended into said groove to cause the travel of the pedal pin with respect to the crank from one end of the slot to the other as said crank revolves.

2. A variable throw crank for bicycles comprising a crank arm having a longitudinal slot in the end thereof, a pedal pin in said slot, a pair of ball bearings on said pin in said slot, a disk on said pin, an annular groove in said disk, a pin fixed in said crank arm and extending into said groove, a second disk on said pedal pin, and a pedal frame on said pedal pin attached to said second disk.

In testimony whereof I have hereunto set my hand this 26" day of January, A. D. 1928.

JAMES E. POYSER.